K. A. OBACH.
MOTOR SLEIGH.
APPLICATION FILED JUNE 14, 1921.
1,414,891.
Patented May 2, 1922.
4 SHEETS—SHEET 2.
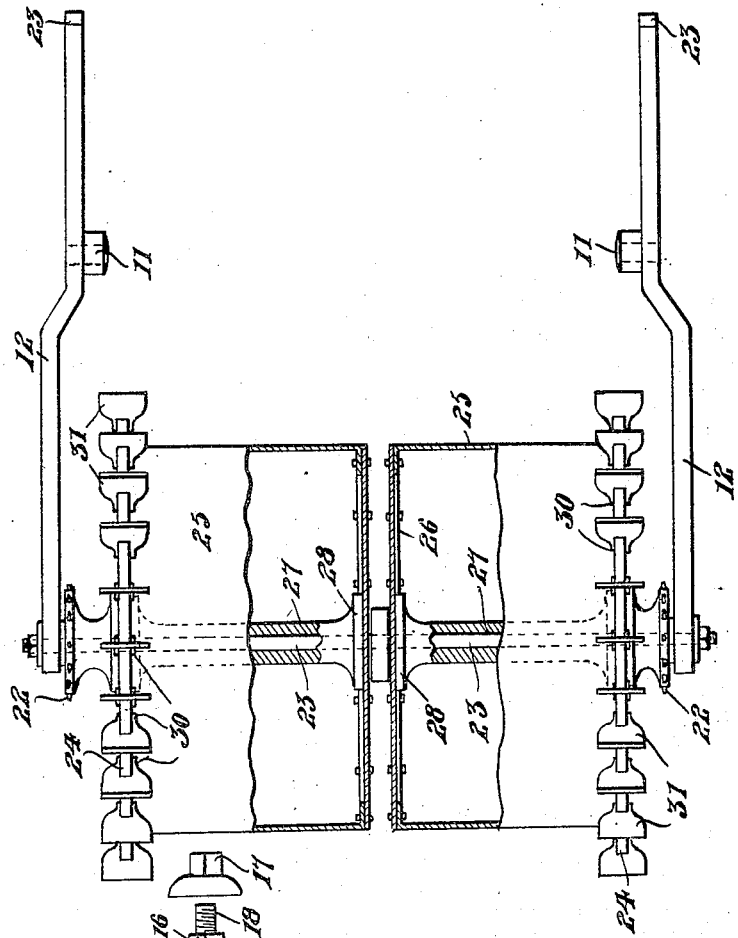
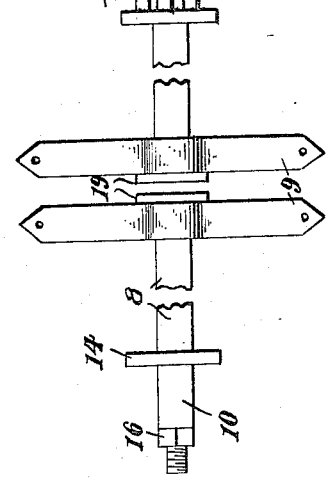
Inventor
K. A. Obach
By R. Morgan Elliott & Co.
Attorney

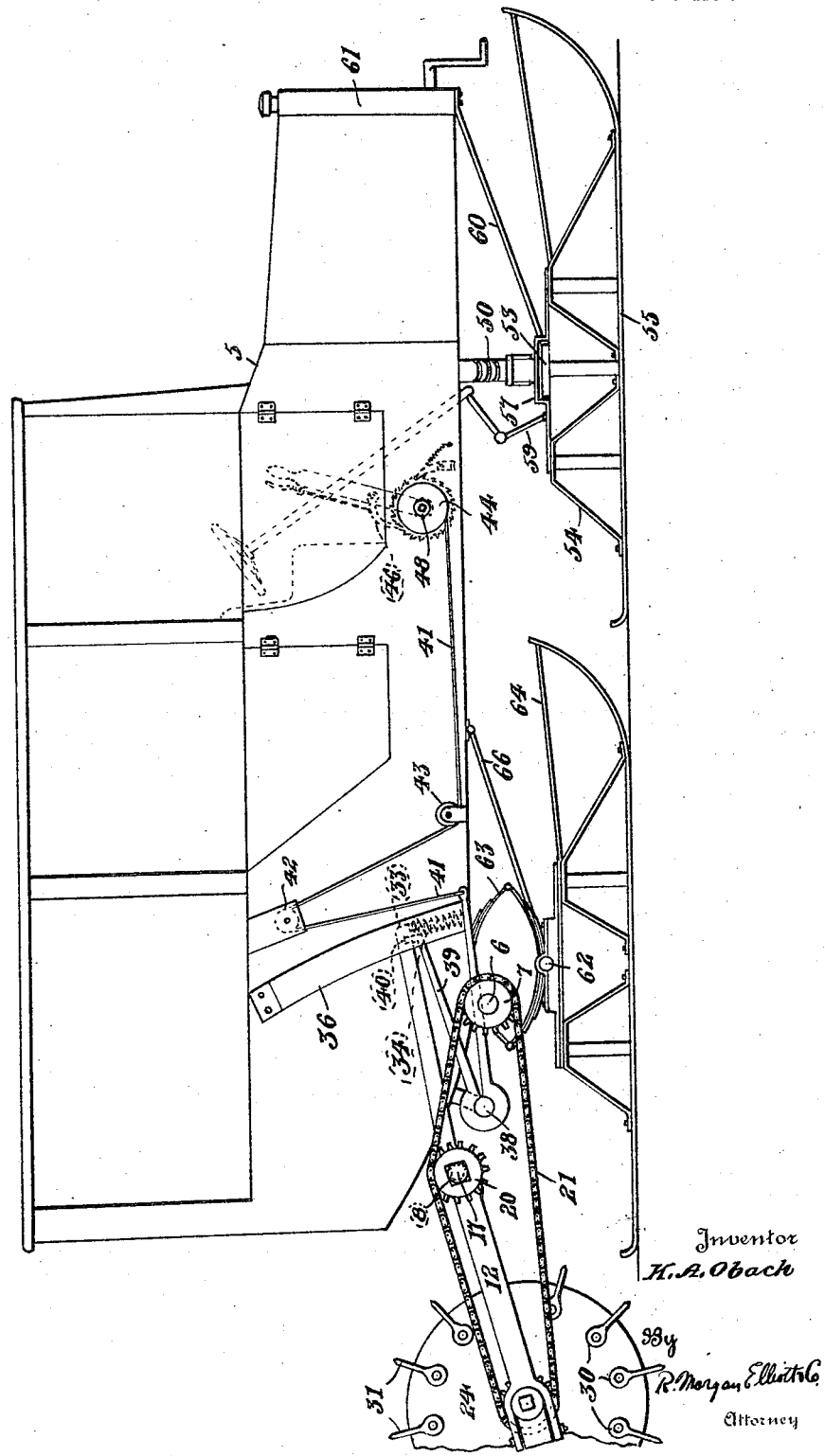

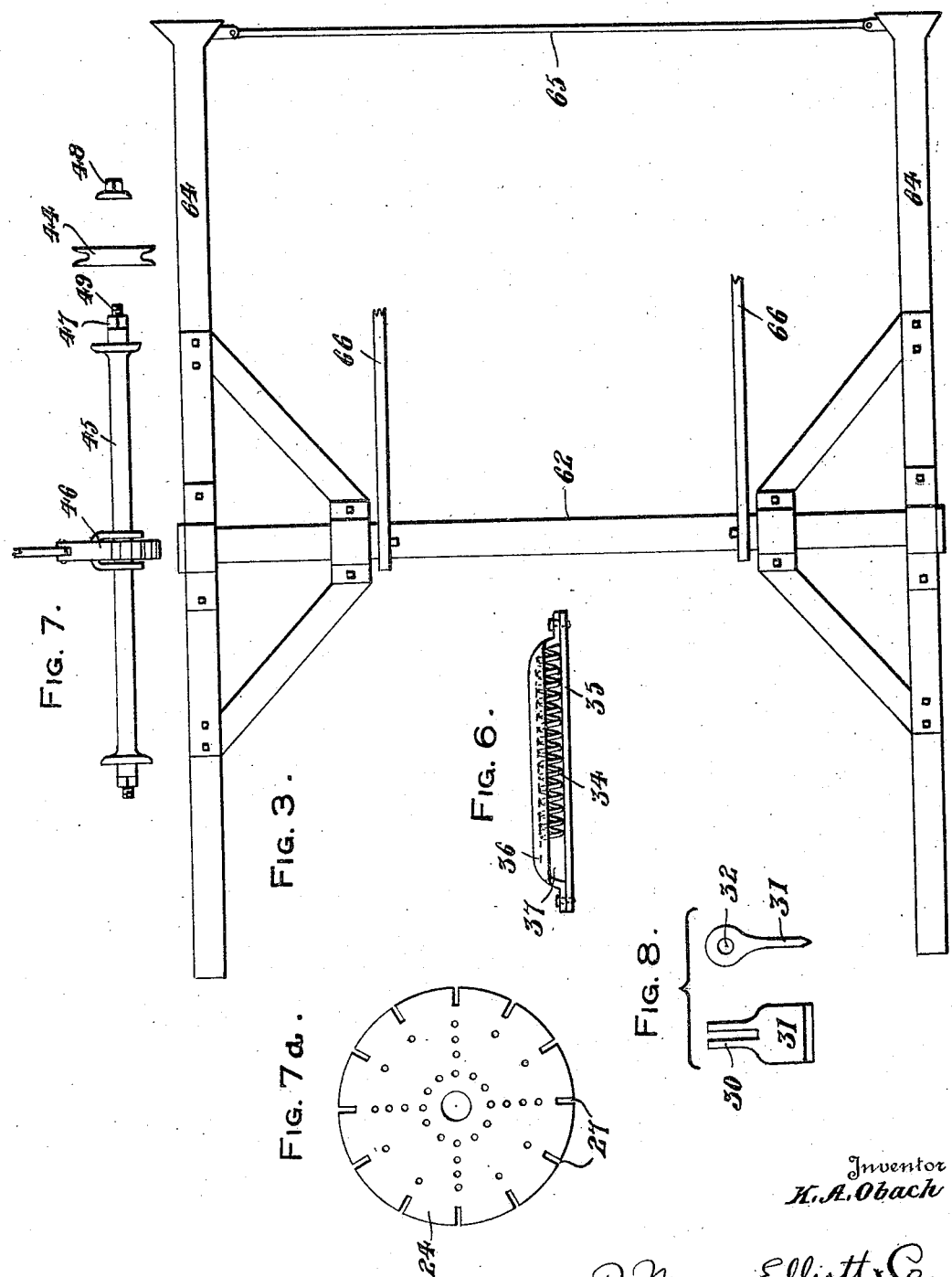

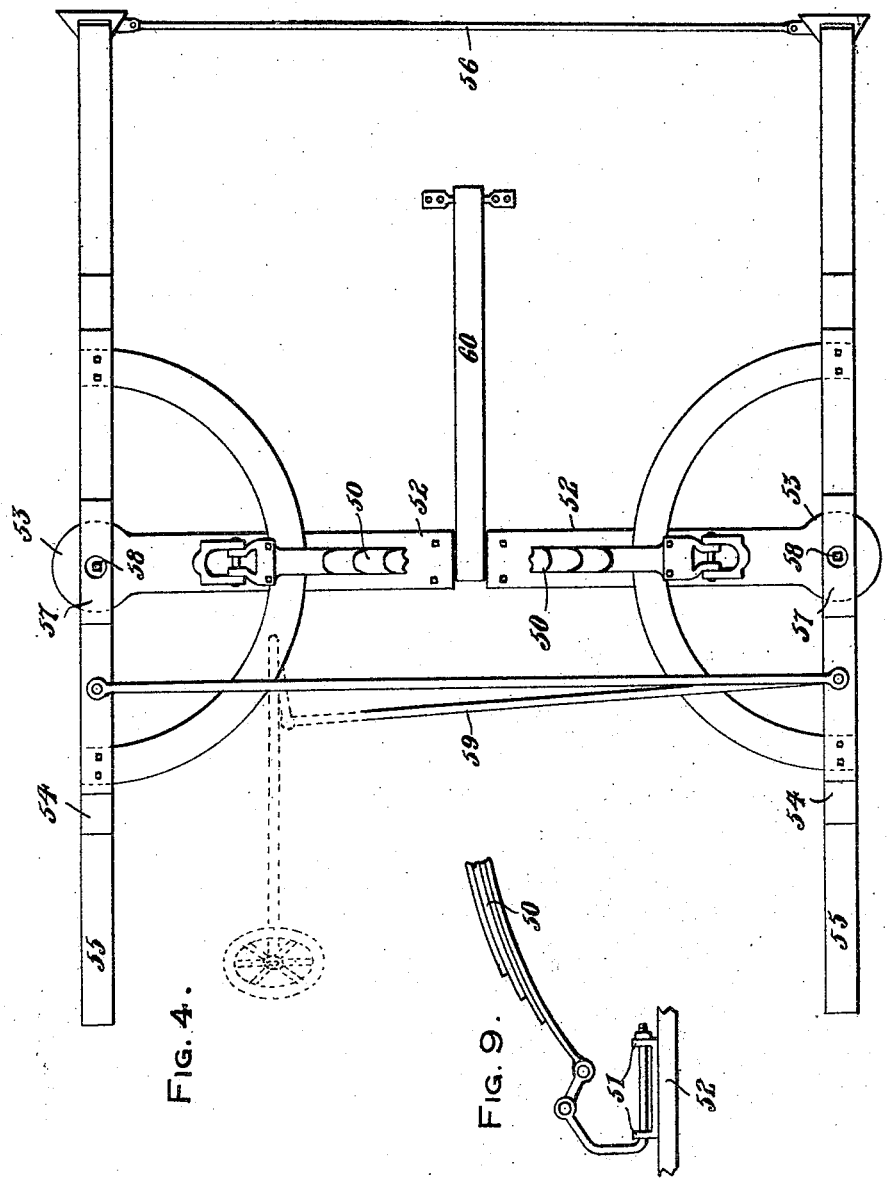

UNITED STATES PATENT OFFICE.

KAZIMNIERZ A. OBACH, OF WINNIPEG, MANITOBA, CANADA, ASSIGNOR OF ONE-HALF TO JOSEPH WELISZEK, OF WINNIPEG, CANADA.

MOTOR SLEIGH.

1,414,891.  Specification of Letters Patent.  Patented May 2, 1922.

Application filed June 14, 1921. Serial No. 477,461.

*To all whom it may concern:*

Be it known that I, KAZIMNIERZ A. OBACH, a citizen of Poland, residing at Winnipeg, in the Province of Manitoba and Dominion of Canada, have invented certain new and useful Improvements in Motor Sleighs, of which the following is a specification.

This invention relates to certain new and useful improvements in motor sleighs and has particular reference to the reconstruction and adjustment of parts to an ordinary automobile for converting the same into a motor sleigh.

The primary object of the invention is to convert an automobile into a motor sleigh by means of a practical mechanism which may be readily installed and placed into practical use.

Another object of the invention is to provide mechanism adapted to be attached to an automobile upon removal of certain parts of the latter whereby the same is converted into a motor sleigh of simple construction which will efficiently operate for the intended purpose.

With the above general objects in view and others that will appear as the nature of the invention is better understood, the same consists in the novel form, combination and arrangement of parts hereinafter more fully described, shown in the accompanying drawings and claimed.

In the drawings,

Figure 1 is a side elevational view of a motor sleigh constructed in accordance with the present invention, partly broken away, Figure 2 is a view partly in plan and partly broken away of the traction drums and supporting arms therefor, Figure 3 is a fragmentary top plan view of the rear sleigh runner construction, Figure 4 is a view somewhat similar to Figure 3 of the front sleigh runner construction, Figure 5 is a fragmentary plan view of the shafts and associated parts for supporting the pivoted traction drum supporting arms, Figure 6 is an edge view of the housing and spring employed at the forward ends of the traction drum supporting arms, Figure 7 is a developed view in elevation partly broken away of the ratchet drum shaft and associated parts employed for forcing the traction drums into engagement with the snow or ice, Figure 7$^a$ is a side elevational view of the spur carrying disk of one of the traction drums, Figure 8 shows one of the traction spurs in side elevation and edge view, and Figure 9 is a fragmentary elevational view illustrating the supporting means for the ends of the front spring employed between the body of the vehicle and the front sleigh construction.

Referring more in detail to the several views, the invention contemplates the modification of an automobile 5 by removing the rear supporting wheels from the rear axle 6 of the latter and fixing sprocket wheels upon the ends of said axles, one of which sprocket wheels is shown at 7 in Figure 1, the construction being similar at opposite sides of the vehicle. A pair of similar shafts 8 are journaled underneath the body of the vehicle rearwardly of the axle 6 in suitable brackets 9 (see Figure 5), and each of these shafts 8 has an annular portion 10 adjacent its outer end which is adapted to extend through the collar 11 of the adjacent supporting arm 12 with suitable roller bearings 13 disposed upon said shaft portion 10 and within said collar 11 so that said arms 12 are pivotally mounted for vertical swinging movement. An annular flange 14 is provided on each shaft section 8 inwardly of the portion 10, and a disk 15 is disposed upon the squared portion 16 of each shaft section 8 so as to confine the roller bearings 13 and the collars 11, the disks 15 being secured in place by a nut 17 screwed upon the extreme end portion of each shaft section 8, which end portions are reduced and threaded as at 18. The inner ends of the shaft sections 8 are provided with annular flanges as at 19 inwardly of the bearings or bearing brackets 9 so as to prevent separating movement of said shaft sections 8. A sprocket wheel 20 is fastened upon each of the squared portions 16 of the shaft sections 8, and a sprocket chain 21 passes around the sprocket wheels 7 and 20 as well as also around another sprocket wheel 22 journaled upon the adjacent end portion of a transverse axle 23 which has its end suitably mounted in the rear ends of the arms 12.

Each sprocket wheel 22 is riveted to a disk 24 secured to the outer end of a traction drum 25 which also embodies an inner disk 26 and a hub 27 journaled upon the axle 23, the disks 24 and 26 being secured to the end flanges 28 of the hub 27. Each disk 24 has a plurality of uniformly spaced slots 29 in the edge thereof, and the bifurcated portions 30 of traction spurs 31 engage opposite sides of the disk 24 with the body of the spurs seated in said slots, the bifurcated portions being apertured as at 32 whereby the same may be riveted to the disk 24. This provides a durable construction with the spurs 31 of each drum serving to engage the ice or snow for propelling the vehicle and with the drums 25 resting upon said ice or snow and furnishing a broad surface so as to keep the traction means from sinking too far into the ice or snow. It will thus be seen that the traction drum at each end portion of the axle 23 is independent of the other traction drum and is separately driven by a sprocket gearing from a different end of the rear axle 6 which is provided with the usual differential gearing, not shown, and thus all of the advantages of such differential gearing are provided for.

The forward end of each traction drum supporting arm 12 terminates slightly forwardly of the rear axle 6 and has a downturned portion 33 which is seated in the upper end of a helical compression spring 34 which is suitably mounted in a casing fixed to the adjacent side of the body of the automobile, and which casing embodies a base plate 35 and a curved cover plate 36 having their rear edges separated to provide a vertical slot 37 in which the forward end of the adjacent arm 12 works. The springs 34 thus tend to swing the arms 12 about the shaft sections 8 for engaging the spurs 31 with the snow or ice.

A stub shaft 38 is suitably mounted beneath the body of the vehicle at each side beneath the adjacent arm 12 and between the rear axle 6 and the shaft sections 8, and a looped spring element 39 has its central portion mounted upon the adjacent stub shaft 38 so that the arms of said spring element extend forwardly. The arms of the spring element 39 tend to normally separate, and the upper arm of the same is provided with an upturned end portion 40 bearing against the under side of the adjacent arm 12 near the spring 34, while the lower arm of said spring element 39 has its forward end attached to one end of a flexible member 41 which extends upwardly and around a guide 42 mounted upon the adjacent side of the body.

The flexible member 41 then extends downwardly and forwardly around a further guide 43 from which it passes to and is secured upon a drum 44. One of said drums 44 is fixed upon the adjacent projecting end portion of a transverse shaft 45 which is suitably journaled through the body of the vehicle in front of the driver's seat, and hand operated ratchet mechanism generally denoted by the numeral 46 is provided within reach of the operator for winding the flexible members 41 upon the drums 44 or for permitting unwinding of the same as desired. The ends of the shaft 45 are squared as at 47 to fit similar openings in the drums 44 and said drums are retained in place by means of nuts 48 screwed upon the threaded portions 49 of said shaft 45. It will thus be seen that by winding the flexible members 41 upon the drums 44, the spring elements 39 may be tilted about the stub shafts 38 so as to cause the upper arms of said spring elements to forcibly swing the arms 12 about their pivots, whereby substantially positive traction effort is insured for the traction spurs in case the springs 34 are not sufficiently strong at certain times and under certain conditions. At the same time, the arms of the spring elements 39 will yield to prevent breakage of parts and other similar serious damage.

The front construction of the vehicle, indicated at 50, has its opposite end portions associated with brackets 51 which are secured upon the upper surface of a transverse axle 52 having enlarged end portions as at 53 which rest upon the upper surfaces of the frame 54 and said frames are each provided with runners 55 connected at their forward ends by a tie rod 56. Suitable keeper plates 57 are secured upon the frames 54 and overlie the enlarged portions 53 of the front axle 52, while a vertical pivot pin 58 passes through the member 57 and the upper portion of each runner frame 54 whereby the runners at each end of the front axle are pivotally mounted for horizontal swinging movement. The usual steering mechanism generally denoted by the numeral 59 of the vehicle is connected with the runner frames of the front sleigh construction rearwardly of the axle 52 as shown in Figures 1 and 4 for steering purposes. The front runner construction may be suitably braced by means of a brace rod 60 connected at its rear end to the central portion of the front axle 52 and extending upwardly and forwardly where its forward end is fixed to the underside of the body near the radiator 61.

A supplemental rear axle 62 supports the rear springs 63 which are preferably of elliptical form and arranged between said supplemental axle 62 and the body of the vehicle, and suitable runner carrying frames 64 are pivoted upon the end portions of said supplemental rear axle 62 so as to tilt for riding over inequalities in the surface of the snow or ice. These runner carrying frames 64 are preferably rigidly connected at their forward ends by a tie rod 65 and the axle 62 is preferably braced against longitudinal strains by means of brace rods 66 connected with the axle 62 and with the body of the vehicle forwardly of said axle. In operation, power is applied to the rear axle 6 in the usual manner and through the sprocket gearing at each side, the traction drums 25 are driven for propelling the vehicle over the snow or ice, said traction drums being maintained in proper engagement with the surface by means of the springs 34 as will be apparent. In case the tractive effort is not sufficient, the operator may manually rotate shaft 45 in the proper direction by means of the ratchet mechanism 46 so that the flexible member 41 at each side is wound upon a drum 44 and the spring elements 39 are tilted upwardly for forcing the arms 12 to swing about their pivots with the rear portions of said arms moving downwardly and causing forcible engagement of the spurs 31 with the snow or ice. When the forcible tractive effort is no longer needed, the ratchet mechanism 46 may be released and the parts will return to their normal position by reason of the separating movement of the arms of the spring elements 39 and the tendency of said elements to move downwardly by gravity.

From the foregoing description, it is believed that the construction and operation as well as the advantages of the present invention will be readily understood and appreciated by those skilled in the art.

Minor changes may be made without departing from the spirit and scope of the invention as claimed.

What is claimed as new is:

In a motor sleigh, the combination with a runner provided vehicle body having a rear driven axle, a pair of arms disposed at the sides of said body and extending rearwardly beyond the latter, means to pivotally mount said arms for vertical swinging movements to the rear portion of said body, rotatable spur carrying drums journaled between the rear ends of said arms, means for transmitting rotary motion from the rear axle to said drums, housings or casings attached to the sides of the body into which the forward ends of said arms project and are vertically movable, springs within said housings beneath the forward ends of said arms for normally yieldingly holding said arms in a tilted position with the spurs of the traction drums yieldingly engaging the ground, manually operable means associated with the forward ends of said arms for forcibly tilting the latter to increase the tractive effort of the spur carrying drums, said last named means embodying a resilient spring element of looped form arranged beneath the forward end of each arm and pivoted upon a horizontal axis with the arms of said spring element extending forwardly and with the upper arm of the element engaging the under side of the adjacent traction drum carrying arm, said spring elements each embodying normally separated resiliently connected arms, and means for exerting an upward pull upon the lower arm of each spring element.

In testimony whereof I affix my signature.

KAZIMNIERZ A. OBACH.